United States Patent
Kusaba

(10) Patent No.: US 10,847,768 B2
(45) Date of Patent: Nov. 24, 2020

(54) BATTERY MODULE AND METHOD FOR MANUFACTURING SAME

(71) Applicant: TOYODA GOSEI CO., LTD., Kiyosu (JP)

(72) Inventor: Kosuke Kusaba, Kiyosu (JP)

(73) Assignee: TOYODA GOSEI CO., LTD., Aichi-pref. (JP)

(*) Notice: Subject to any disclaimer, the term of this patent is extended or adjusted under 35 U.S.C. 154(b) by 252 days.

(21) Appl. No.: 15/962,140

(22) Filed: Apr. 25, 2018

(65) Prior Publication Data

US 2018/0248158 A1 Aug. 30, 2018

Related U.S. Application Data

(62) Division of application No. 14/989,834, filed on Jan. 7, 2016, now abandoned.

(30) Foreign Application Priority Data

Mar. 16, 2015 (JP) .................................. 2015-052454

(51) Int. Cl.
*H01M 2/10* (2006.01)

(52) U.S. Cl.
CPC ...... *H01M 2/1072* (2013.01); *H01M 2220/20* (2013.01)

(58) Field of Classification Search
CPC .... H01M 2/08; H01M 2/1072; H01M 2/0267; H01M 2/105; H01M 2/1077;

(Continued)

(56) References Cited

U.S. PATENT DOCUMENTS

2006/0251962 A1* 11/2006 Kim ................... H01M 2/1653
429/130
2011/0135975 A1* 6/2011 Fuhr ....................... H01M 2/08
429/53

(Continued)

FOREIGN PATENT DOCUMENTS

JP 2013-008655 A 1/2013
JP 2015-106432 A 6/2015

OTHER PUBLICATIONS

Office Action dated Feb. 22, 2018 issued in corresponding JP patent application No. 2015-052454 (and English translation).

(Continued)

*Primary Examiner* — Miriam Stagg
*Assistant Examiner* — Lilia Nedialkova
(74) *Attorney, Agent, or Firm* — Posz Law Group, PLC

(57) ABSTRACT

In a battery module in which battery cells are inserted and adhered to battery retention sections each having a hole and formed on a holder, an objective is to provide a technology for sufficiently filling the gap between the battery retention section of the holder and the battery cell with an adhesive. A deformable porous layer 40 is formed on an outer circumferential surface 11 of each battery cell 1, and an adhesion layer 4 is formed by impregnating the porous layer 40 with an adhesive. Alternatively, the deformable porous layer 40 is formed on the outer circumferential surface 11 of each of the battery cells 1, and an adhesive layer 46 including an adhesive is formed on the back side in an insertion direction with respect to the porous layer 40.

7 Claims, 9 Drawing Sheets

(58) Field of Classification Search
CPC ............ H01M 2/1016; H01M 2/1022; H01M 10/0404; H01M 2220/20
See application file for complete search history.

(56) References Cited

U.S. PATENT DOCUMENTS

| | | | |
|---|---|---|---|
| 2011/0165446 A1* | 7/2011 | Hermann | H01M 2/105 |
| | | | 429/99 |
| 2011/0287302 A1 | 11/2011 | Kim | |
| 2012/0082887 A1 | 4/2012 | Ninomiya et al. | |
| 2012/0251848 A1 | 10/2012 | Cho | |
| 2014/0017536 A1 | 1/2014 | Lu et al. | |
| 2014/0370221 A1 | 12/2014 | Chen et al. | |
| 2016/0149175 A1* | 5/2016 | Morimitsu | H01M 2/1077 |
| | | | 429/156 |

OTHER PUBLICATIONS

Office Action dated Aug. 28, 2019 issued in corresponding DE patent application No. 10 2016 001 636.1 (and English translation).

* cited by examiner

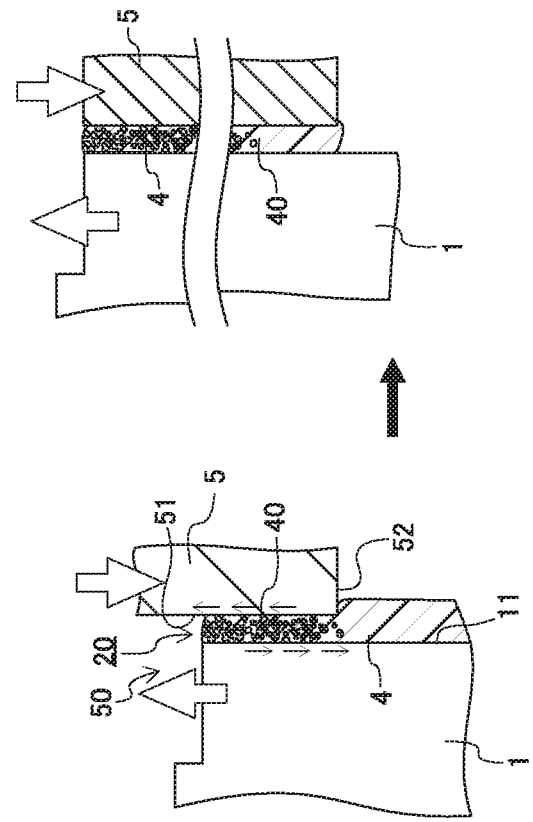
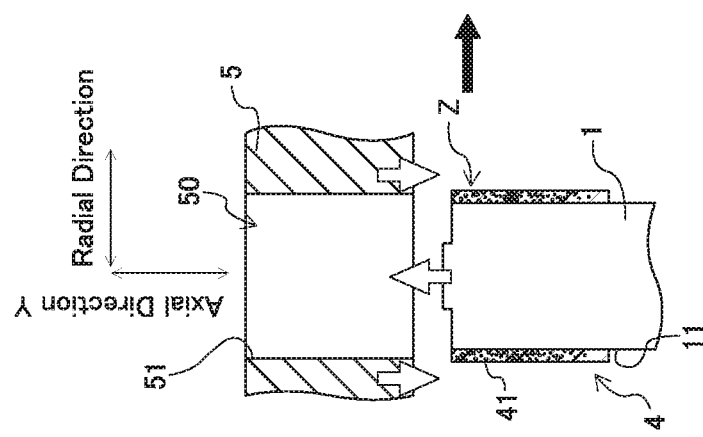
Fig. 5

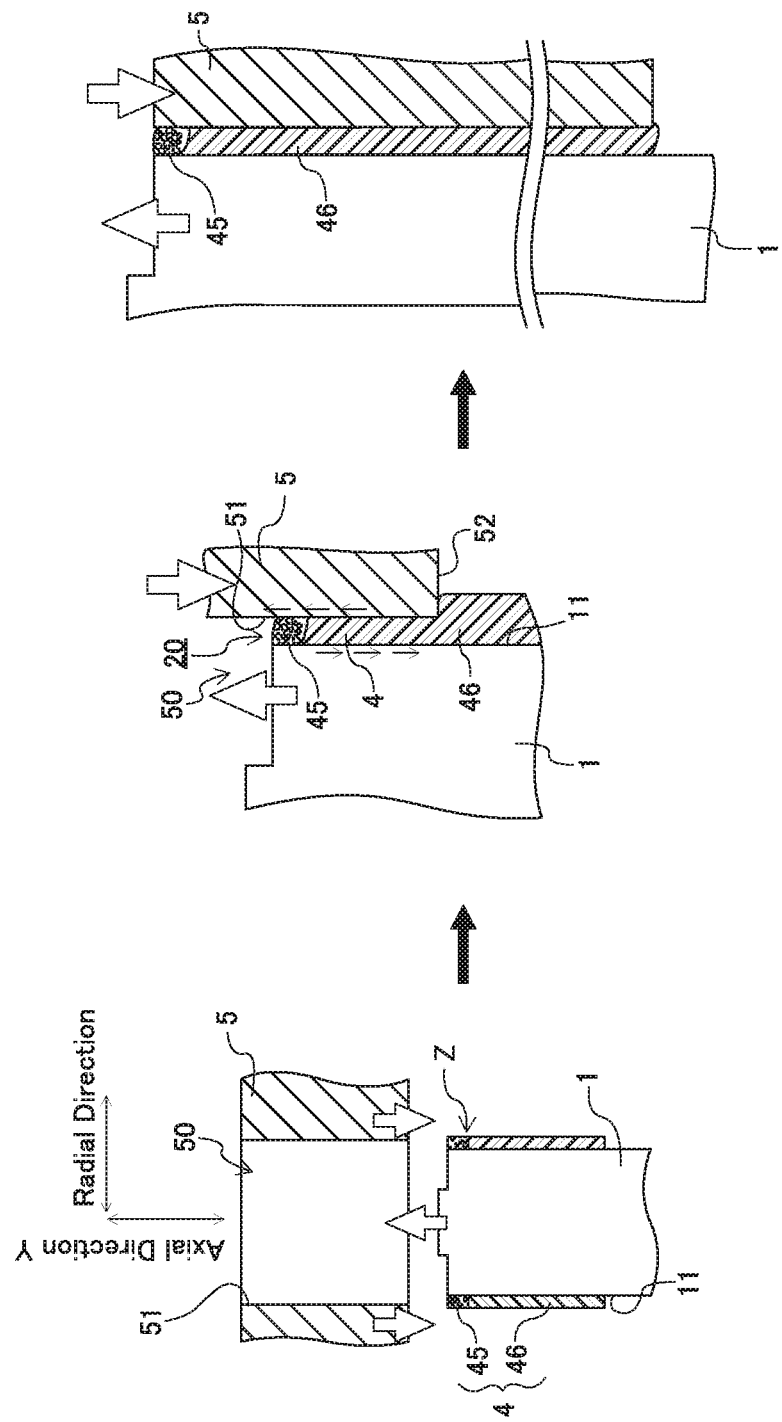

BATTERY MODULE AND METHOD FOR MANUFACTURING SAME

CROSS REFERENCE TO RELATED APPLICATIONS

This application is a divisional of U.S. patent application Ser. No. 14/989,834 filed on Jan. 7, 2016, and is based on, claims priority to, and incorporates herein by reference Japanese Patent Application No. 2015-052454 filed on Mar. 16, 2015.

TECHNICAL FIELD

The present invention relates to a battery module including a battery cell and a holder for holding the battery cell, and a method for manufacturing the battery module.

BACKGROUND ART

A battery cell in a battery module is generally adhered to a holder. For example, a battery module disclosed in JP2013008655 (A) is formed by integrally adhering multiple battery cells to a holder. This type of battery module is referred to as an assembled battery, and is applied in various use applications such as, for example, batteries for vehicles.

In the battery module disclosed in JP2013008655 (A), battery retention sections each having a hole are formed on the holder, and the battery cells are inserted in the battery retention sections. When manufacturing this type of battery modules, an adhesive is injected into respective gaps between inner circumferential surfaces of the battery retention sections and outer circumferential surfaces of the battery cells in the holder, and adhesion parts are formed when the adhesive solidifies. With the method of injecting the adhesive between the inner circumferential surfaces of the battery retention sections and the outer circumferential surfaces of the battery cells (i.e., potting method), injection and solidification of the adhesive takes a long time, resulting in inferior working efficiency.

In order to improve the working efficiency, for example, a conceivable method is to apply the adhesive on the outer circumferential surface of the battery cell, and insert, in the battery retention section of the holder, the battery cell having the adhesive applied thereon.

For the purpose of stably holding the battery cell in the holder, having the gap between the inner circumferential surface of the battery retention section formed in the holder and the outer circumferential surface of the battery cell to be not too large is considered preferable.

In this case, the adhesive has to fill a narrow gap. However, since the adhesive has a relatively high viscosity, the frictional resistance between the inner circumferential surface of the battery retention section and the adhesive is relatively large, and uniformly applying and spreading the adhesive are difficult. Thus, uniformly spreading the adhesive throughout a narrow gap between the inner circumferential surface of the battery retention section and the outer circumferential surface of the battery cell has not been easy. When the adhesive is not spread throughout the gap between the inner circumferential surface of the battery retention section and the outer circumferential surface of the battery cell, and air is caught inside an adhesion layer, the size of an adhesion area between the solidified adhesive (i.e., adhesion part) and a counterpart material (i.e., the inner circumferential surface of the battery retention section and/or the outer circumferential surface of the battery cell) may decrease or the strength of the adhesion part itself may deteriorate. Thus, the strength of adhesion between the adhesion part and the counterpart material cannot be improved easily, and integrally adhering the battery cell and the holder stably has been difficult.

SUMMARY OF INVENTION

Technical Problem

The present invention has been made in view of the above described circumstances, and an objective is to provide a battery module in which a gap between a battery retention section of a holder and a battery cell is filled sufficiently with an adhesion part, and a method for manufacturing the battery module.

Solution to Problem

A first method for manufacturing a battery module of the present invention solving the above described problem includes:

a preparing step of preparing a battery cell and a holder having a battery retention section with a hole; and an adhesion layer-forming step of forming an adhesion layer on an outer circumferential surface of the battery cell; and an insertion step of inserting the battery cell in the battery retention section of the holder, wherein, in the adhesion layer-forming step, a deformable porous layer is formed on the outer circumferential surface of the battery cell and the porous layer is impregnated with an adhesive to form an adhesion layer including the porous layer and the adhesive.

A second method for manufacturing a battery module of the present invention solving the above described problem includes;

a preparing step of preparing a battery cell and a holder having a battery retention section with a hole; an adhesion layer-forming step of forming an adhesion layer on an outer circumferential surface of the battery cell; and an insertion step of inserting the battery cell in the battery retention section of the holder, wherein in the adhesion layer-forming step, a deformable porous layer is formed in a first area which is a part of the outer circumferential surface of the battery cell, and an adhesive layer including an adhesive is formed on a second area located adjacent to the first area and on a back side thereof in an insertion direction for the battery cell to form an adhesion layer including the porous layer and the adhesive.

A battery module of the present invention solving the above described problem includes:

a holder having a battery retention section with a hole; a battery cell inserted in the battery retention section of the holder; and an adhesion part interposed between the holder and the battery cell, wherein the adhesion part includes a porous layer, and an adhesive at least partially impregnating the porous layer.

Advantageous Effects of Invention

With the first or second method for manufacturing the battery module of the present invention, the adhesive can sufficiently fill the gap between the battery retention section of the holder and the battery cell. The battery module of the present invention has the gap between the battery retention section of the holder and the battery cell filled sufficiently with the adhesive.

BRIEF DESCRIPTION OF DRAWINGS

FIG. 5 is an illustrative diagram schematically showing an insertion step of the manufacturing method of Example 1;

FIG. 9 is an illustrative diagram schematically snowing an insertion step of the manufacturing method of Example 3.

DESCRIPTION OF EMBODIMENTS

In the following, a method for manufacturing a battery module of the present invention is described with specific examples. In the following, if necessary, a method for manufacturing a battery module in each Example is abbreviated simply as a manufacturing method of each of the Examples.

Unless mentioned otherwise in particular, a numeric value range of "x to y" described in the present specification includes, in a range thereof, a lower limit "x" and an upper limit "y." A numeric value range can be formed by arbitrarily combining such upper limit values, lower limit values, and numerical values described in embodiments. In addition, numerical values arbitrarily selected within the numeric value range can be used as upper limit and lower limit numerical values.

Example 1

Figure 1:
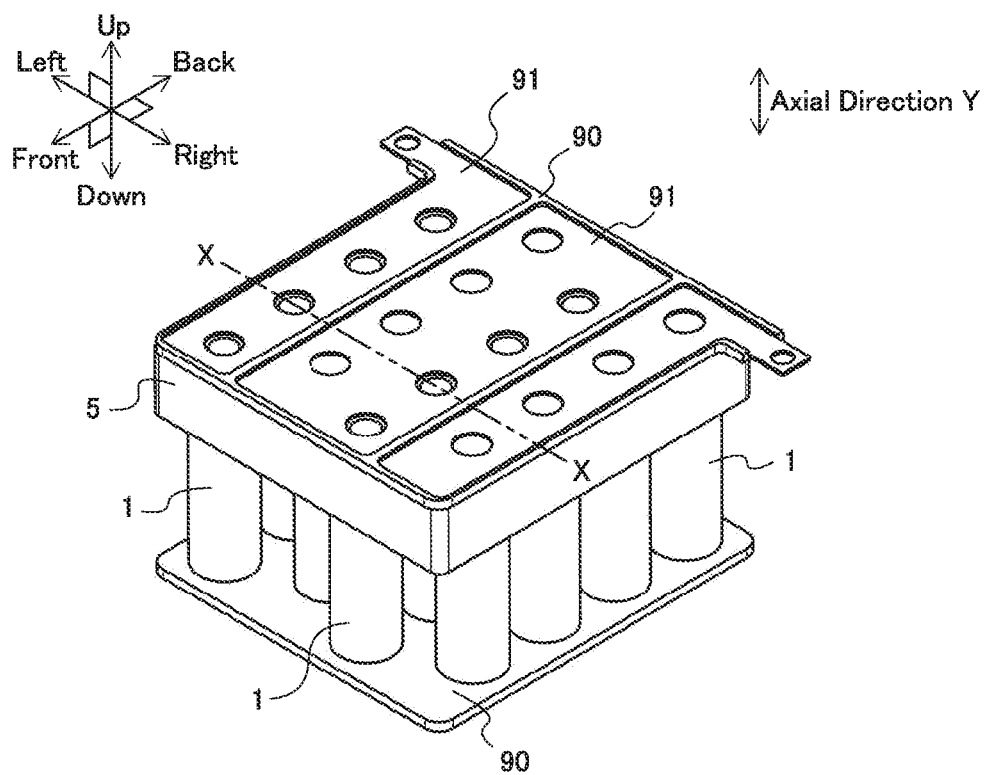
FIG. 1 is a perspective view schematically showing a battery module of Example 1.
Figure 2:
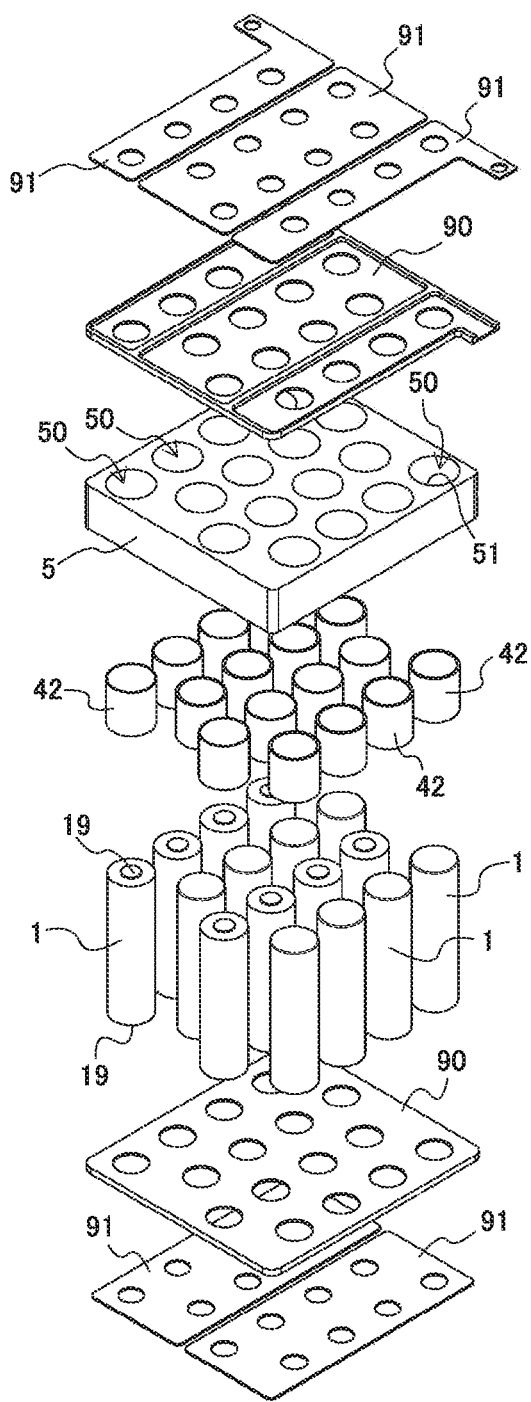
FIG. 2 is an exploded perspective view schematically showing the battery module of Example 1.
Figure 3:
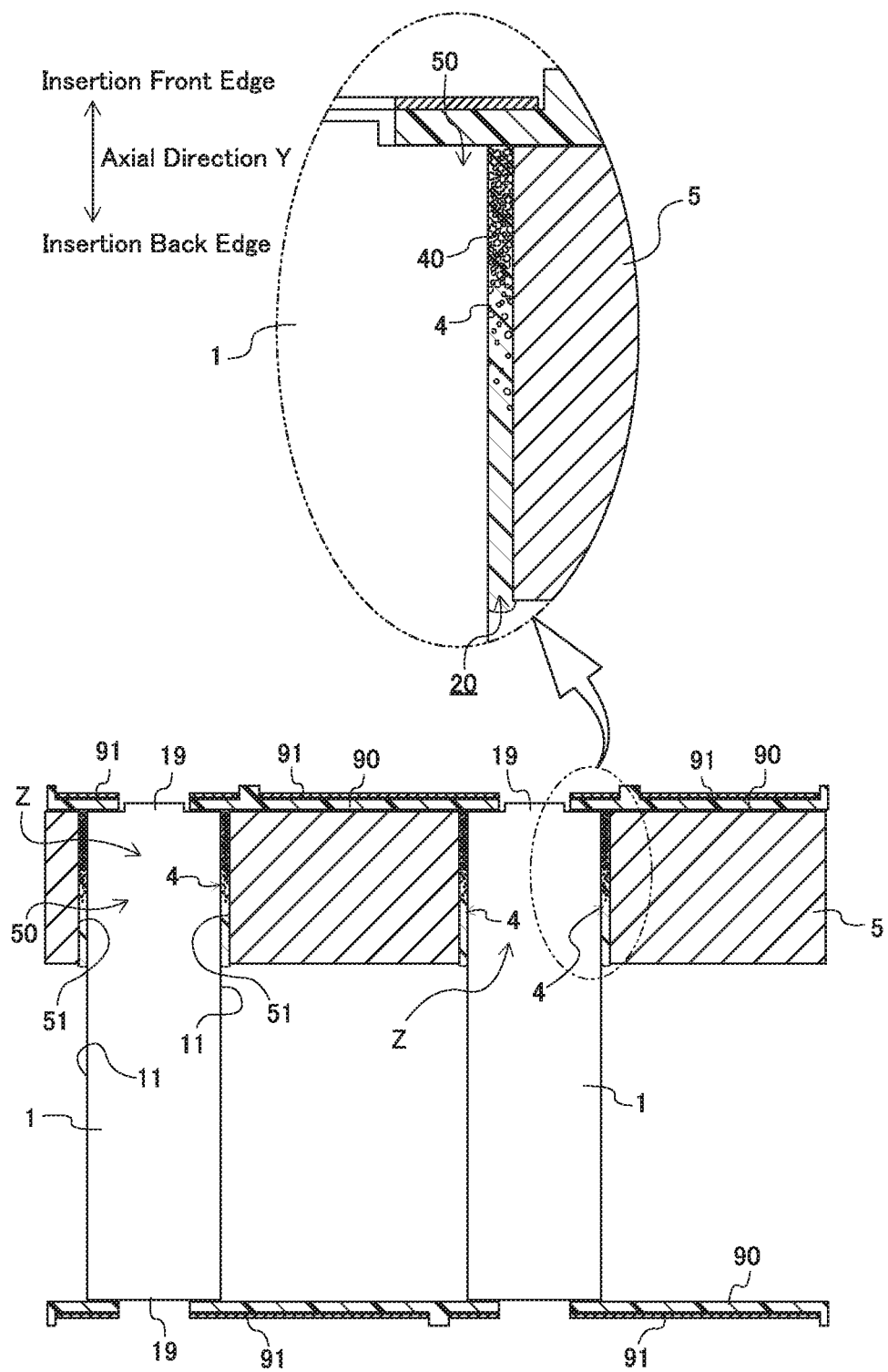
FIG. 3 is a cross sectional view schematically showing the battery module of Example 1 cut at X-X position in FIG. 1.
Figure 4:
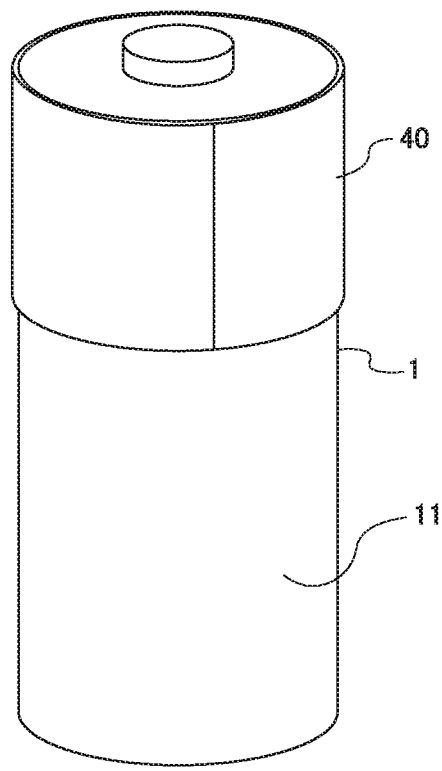
FIG. 4 is an illustrative diagram schematically showing an adhesion layer-forming step of the manufacturing method of Example 1.

Example 1 relates to the first method for manufacturing the battery module of the present invention. FIG. 1 is a perspective view schematically showing a battery module of Example 1. FIG. 2 is an exploded perspective view of the battery module of Example 1 shown in FIG. 1. FIG. 3 is a cross sectional view schematically showing the battery module of the Example 1 cut at X-X position in FIG. 1. FIG. 4 is an illustrative diagram schematically showing an adhesion layer-forming step of the manufacturing method of Example 1. FIG. 5 is an illustrative diagram schematically showing an insertion step of the manufacturing method of Example 1.

In the following Examples, up, down, left, right, front, and back respectively refer to up, down, left, right, front, and back shown in FIG. 1. In each of the Examples, an axial direction Y of a battery cell refers to up-down direction shown in FIG. 1. The axial direction Y of a member other than a battery cell refers to a direction that matches the axial direction Y in an assembled state shown in FIG. 1. In addition, in the following, an insertion direction for a battery cell refers to a direction that matches the axial direction Y.

<Battery Module Manufacturing Method>

The method for manufacturing the battery module of Example 1 is a method for manufacturing a battery module having battery cells 1, adhesion parts 42, and a holder 5 (cf., FIGS. 1 and 2).

Each of the battery cells 1 is inserted in a penetration hole of a battery retention section 50 of the holder 5. As described later, each of the adhesion parts 42 is a layer including a porous layer 40 and a solidified adhesive, and is interposed between an inner circumferential surface 51 of a battery retention section 50 and an outer circumferential surface 11 of each of the battery cells 1 to bind the two. The method for manufacturing the battery module of Example 1 includes a preparing step, an adhesion layer-forming step, and an insertion step.

(Preparing Step)

In the preparing step, the battery cells 1 and the holder 5 are prepared. The battery cells 1 are substantially columnar, and each of the battery retention sections 50 of the holder 5 has a penetration hole with a slightly larger diameter than the outer diameter of each of the battery cells 1. In an assembled state as shown in FIGS. 1 and 3, each of the battery cells 1 has a portion disposed inside the battery retention section 50 in the holder 5, and other portions, i.e., portions disposed outside the battery retention section 50. Thus, in the assembled state, each of the outer circumferential surfaces 11 of the battery cells 1 has an area (referred to as binding area Z) facing the inner circumferential surface 51 of the battery retention section 50 of the holder 5, and other areas. A binding area Z is formed of an area that is a part of the outer circumferential surface 11 of each of the battery cells 1 in the axial direction Y. The binding area Z is continuously formed on the whole circumference in the circumferential direction of each of the battery cells 1. A gap between the inner circumferential surface 51 of the battery retention section 50 and the outer circumferential surface 11 of each of the battery cells 1 is referred to as an adhesion space 20.

(Adhesion Layer-Forming Step)

As shown in FIG. 4, in the adhesion layer-forming step in the manufacturing method of Example 1, first, the porous layer 40, which is cylindrical, is disposed on the outer circumferential surface 11 of each of the battery cells 1. In Example 1, the porous layer 40 is formed by winding, around the outer circumferential surface 11 of each of the battery cells 1, a sponge tape obtained by laminating an adhesive layer (not shown) for tapes on the back surface of a tape made from sponge. The tape of the porous layer 40, i.e., the sponge portion, is made of an open-cell type foamed urethane resin and is elastically deformable.

Next, the porous layer 40 is impregnated with a fluid adhesive. The method for impregnating the porous layer 40 with the adhesive is not particularly limited, and a known method may be appropriately selected depending on the type of the adhesive, and the diameter of the fine pores of the porous layer 40, etc. For example, when the adhesive has low viscosity, i.e., when fluidity of the adhesive is relatively high, or when the diameter of the fine pores of the porous layer 40 is large, the porous layer 40 can be impregnated with the adhesive by simply applying the adhesive on the porous layer 40. In addition, for example, when the adhesive has a relatively high viscosity, i.e., when fluidity of the adhesive is relatively low, or when the diameter of the fine pores of the porous layer 40 is relatively small, the porous layer 40 can be impregnated with the adhesive by disposing the porous layer 40 on each of the battery cells 1, applying the adhesive on the surface of the porous layer 40, and placing each of the battery cells 1 in a reduced pressure atmosphere such as in a vacuum chamber. The method for impregnating the porous layer 40 with the adhesive is not limited to those described above, and various methods may be used. By impregnating the porous layer 40 with the adhesive, an adhesion layer 4 formed of the porous layer 40 and the adhesive can be formed on the outer circumferential surface 11 of each of the battery cells 1.

With this step, the adhesion layer 4 obtained by impregnating the porous layer 40 with the adhesive is formed. Each of the adhesion parts 42 of the battery module of Example 1 is formed when the adhesion layer 4 is left still and solidified.

The outer diameter of the adhesion layer 4 before insertion is larger than the hole diameter of the battery retention section 50 of the holder 5. Thus, the thickness of the adhesion layer 4 at this moment is larger than the distance between the outer circumferential surface 11 of each of the battery cells 1 and the inner circumferential surface 51 of the battery retention section 50 in the assembled state. In other words, as shown in the left side portion of FIG. 5, at the time when respective axes of the battery retention section 50 of the holder 5 and one of the battery cells 1 are aligned before the insertion step (hereinafter, if necessary, referred to "upon axis alignment"); an outer circumferential surface 41 of the cylindrical adhesion layer 4 is positioned outward in the radial direction from the inner circumferential surface 51 of the battery retention section 50. The internal diameter of the substantially cylindrical adhesion layer 4 is smaller than the hole diameter of the battery retention section 50. Thus, in order to fit the inner circumferential surface of the cylindrical adhesion layer 4 to the outer circumferential surface 11 of each of the battery cells 1, upon axis alignment, the inner circumferential surface of the adhesion layer 4 is positioned inward in the radial direction from the inner circumferential surface 51 of the battery retention section 50.

In the manufacturing method of Example 1, the thickness of the porous layer 40 is about 1.0 to 2.0 mm, and the thickness of the adhesion layer 4 is about 0.4 to 1.0 mm. In addition, the width of the adhesion space 20 is about 0.1 to 0.4 mm. The difference between the thickness of the adhesion layer 4 and the width of the adhesion space 20 is about 0 to 0.4 mm. Here, the thickness of the porous layer 40 and the thickness of the adhesion layer 4 both refer to an average of thicknesses of each of the layers, and the width of the adhesion space 20 refers to an average of the distance between the outer circumferential surface 11 of each of the battery cells 1 and the inner circumferential surface 51 of the battery retention section 50.

(Insertion Step)

After the adhesion layer-forming step described above, each of the battery cells 1 having the adhesion layer 4 formed thereon is aligned with the battery retention section 50 of the holder 5 using respective axes, and each of the battery cells 1 is inserted in the battery retention section 50. Specifically, as shown in the left side portion in FIG. 5, the battery cells 1 are moved along the axial direction Y with respect to the holder 5 that is fixed, and, as shown in the central portion in FIG. 5, the battery cells 1 are inserted in the respective battery retention sections 50. At this moment, the battery cells 1 have moved relative to the holder 5 upward from below in FIG. 1.

As described above, the adhesion layer 4 is disposed on the outer circumferential surface 11 of each of the battery cells 1. In addition, the thickness of the adhesion layer 4 is larger than the width of the adhesion space 20. Thus, as shown in the central portion in FIG. 5, when inserting each of the battery cells 1 in the battery retention section 50, the adhesion layer 4 is pressed against an insertion edge 52 of the battery retention section 50 and the inner circumferential surface 51, and penetrates the adhesion space 20 while being compressed.

As described above, the adhesion layer 4 includes the porous layer 40 having a large number of fine pores, and the porous layer 40 is deformable. Thus, in the insertion step, the porous layer 40 in the adhesion layer 4 is deformed and is pressed toward the adhesion space 20. Since the porous layer 40 can retain its own shape by itself, the porous layer 40 penetrates the adhesion space 20 as a whole while being accompanied by a certain degree of compressive deformation as shown in the central portion in FIG. 5.

At this moment, associated with the deformation of the porous layer 40, one portion of the adhesive impregnating the fine pores of the porous layer 40 leaks outside the porous layer 40, and moves to the surface of the porous layer 40, i.e., the surface of the adhesion layer 4. Since the adhesive is a fluid and can deform more easily than the porous layer 40 and the battery retention section 50, the adhesive functions as a lubricant for the porous layer 40. On the other hand, since the porous layer 40 is able to retain shape, the porous layer 40 functions as a pressing material for applying and spreading the adhesive. Thus, in the insertion step, as the porous layer 40 penetrates the adhesion space 20, the adhesive held in the porous layer 40 also penetrates the adhesion space 20, the adhesive is applied and spread within the adhesion space 20 along the inner circumferential surface 51 of the battery retention section 50, and the porous layer 40 further advances forward in the insertion direction due to lubricative action of the adhesive. In this manner, the adhesion layer 4 fills the adhesion space 20 without leaving any gaps.

(Cell Binding Step)

After the insertion step described above, a complex, formed of the battery cells 1, the holder 5, and the adhesion layers 4 and obtained when the battery cells 1 are inserted in the battery retention section 50 and the adhesion space 20 is filled with the adhesion layer 4, is left still to enable the liquid adhesive to harden into a solid state to obtain the battery module of Example 1 including the adhesion parts 42, the battery cells 1, and the holder 5.

The length of the porous layer 40 in the axial direction after the insertion step is substantially identical to the length of the binding area Z in the axial direction, and the length of the adhesion parts 42 in the battery module in the axial direction also substantially identical to the length of the binding area Z in the axial direction.

With the manufacturing method of Example 1, as a result of the adhesion layer 4 being formed of two elements, i.e., the porous layer 40 and the adhesive, and causing the porous layer 40 and the adhesive to affect each other in the insertion step; the battery module in which the adhesion layer 4 sufficiently fills the gap between the battery retention section 50 of the holder 5 and each of the battery cells 1 can be manufactured easily.

In other words, in the battery module obtained from the manufacturing method of Example 1, the adhesion layer 4 including the porous layer 40 and the adhesive fills the gap between the battery retention section 50 of the holder 5 and each of the battery cells 1, and an excellent adhesive strength is obtained for each of the adhesion parts 42 formed through solidification of the adhesion layer 4.

The manufacturing method of the present invention is achieved as long as, as described above, the porous layer 40 is deformable, and the adhesive has a fluidity higher than the porous layer 40 and is more easily deformed than the porous layer 40. In other words, the porous layer 40 is a deformable solid and the adhesive is a fluid. Furthermore, the solid porous layer 40 does not break even when being deformed, and the fluid adhesive has fluidity and conforms to the shape of a counterpart. With the manufacturing method of the present invention, as a result of combining the adhesive and the porous layer 40 as described above; the battery module in which the adhesion layer 4 sufficiently fills the gap between the battery retention section 50 of the holder 5 and each of the battery cells 1 can be manufactured easily.

In the adhesion layer-forming step of the manufacturing method of Example 1, although the porous layer 40 is disposed over the whole circumference of the outer circumferential surface 11 of each of the battery cells 1; in the adhesion layer-forming step of the manufacturing method of the present invention, the porous layer 40 does not have to be disposed over the whole circumference of the outer circumferential surface 11 of each of the battery cells 1. For example, the porous layer 40 may be provided with one or more slits extending in the axial direction Y. In this case, when the amount of deformation of the porous layer 40 is sufficiently large and the width of the slit is sufficiently small, the slit closes at the insertion step when the porous layer 40 deforms. Since the adhesive follows the porous layer 40 and fills the slit, the adhesion layer 4 is formed practically on the whole circumference of the outer circumferential surface 11 of each of the battery cells 1.

In the adhesion layer-forming step, although the adhesive preferably impregnates the whole porous layer 40, a portion not impregnated with the adhesive may partially exist in the porous layer 40 at the adhesion layer-forming step. By having the adhesive move associated with deformation of the porous layer 40 at the insertion step, the part of the porous layer 40 not impregnated with the adhesive at the adhesion layer-forming step may also be provided with the adhesive at the insertion step depending on the amount of deformation of the porous layer 40. Considering the adhesive property of the adhesion layer 4, the adhesion layer 4 preferably contains a large amount of the adhesive, and the adhesive preferably impregnates the porous layer 40 at a level where the surface of the porous layer 40 is soaked at the adhesion layer-forming step.

Although the porous layer 40 is elastically deformable in the manufacturing method of Example 1; the manufacturing method of the present invention is achieved as long as the porous layer 40 is deformable and may deform plastically. When the porous layer 40 is elastically deformable, the porous layer 40, which has elastically deformed due to being pressed against the inner circumferential surface 51 of the battery retention section 50 and/or the insertion edge 52 of the holder 5 at the insertion step, fills the adhesion space 20 because of its oven elasticity. The adhesive that has leaked from the porous layer 40 at the time of deformation is absorbed again by the porous layer 40 when the porous layer 40 returns to its original shape through elasticity. In this case, the adhesion space 20 is filled with the porous layer 40 holding the adhesive sufficiently, i.e., the adhesion layer 4. In addition, by having the adhesive absorbed by the porous layer 40 again, leakage of the adhesive from the battery cells 1 at an end in the axial direction Y can be suppressed. As a result, loss of the adhesive can be suppressed, and formation of an insulation part by any leaked adhesive near an end of any one of the battery cells 1, i.e., near a terminal section of one of the battery cells 1, in the axial direction Y can be suppressed.

Although the porous layer 40 may be electrically conductive as long as the porous layer 40 does not touch the terminal section, obviously, the porous layer 40 is preferably electrically insulative. Examples of materials for the electrically insulative porous layer 40 include resins, rubbers, elastomers, and glass fibers, etc. These materials may be formed into a three dimensional shape or, for example, a sponge, a nonwoven fabric, a woven fabric, a net, a coil, and/or a brush to be used as the porous layer 40. The number, shape, and degree of porosity of the fine pores in the porous layer 40 are not particularly limited. However, the porous layer 40 is preferably an open-cell type, considering the porous layer 40 is to be impregnated with the adhesive. An open-cell type porous layer 40 refers to a porous layer 40 whose fine pores are interconnected cells, and, more specifically, refers to a porous layer 40 in which at least one portion of fine pores are communicatively connected with each other to form penetration holes. On the other hand, a closed-cell type porous layer 40 refers to a porous layer 40 whose fine pores are isolated cells, and, more specifically, refers to a porous layer 40 in which fine pores are independent from each other and are not communicatively connected.

The porous layer 40 used in the first method for manufacturing the battery module has to be an open-cell type. The porous layer 40 used. In the second method for manufacturing the battery module may be an open-cell type or a closed-cell type, but an open-cell type is preferable. Considering the impregnation with the adhesive, the average pore size of the fine pores in the porous layer 40 is preferably not smaller than 100 µm and more preferably not smaller than 1000 µm. The average pore size can be measured with a nitrogen gas adsorption method.

Although any adhesive may be used, and the material, viscosity, and the like thereof are not particularly limited; an angle of contact with respect to the porous layer 40 before solidification is preferably small. Specifically the angle of contact is preferably not larger than 30° and more preferably not larger than 15°.

In the following, the battery module of Example 1 will be described as reference.

<Battery Module=

A battery module of Example 1 is obtained through the method for manufacturing a battery module of Example 1. As shown in FIGS. 1 and 2, the battery module of Example includes the battery cells 1, the adhesion parts 42, the holder 5, a separator 90, and bus bars 91.

The battery module of Example 1 holds sixteen of the battery cells 1. The battery cells 1 are cylindrical cells having substantially the same shape, and each have terminals 19 (positive electrode terminal and negative electrode terminal) on both ends in the axial direction Y. The holder 5 has a substantially plate-like shape, and holds sixteen of the battery retention sections 50. Each of the battery retention sections 50 is formed with a penetration hole, and the internal diameter of each of the battery retention sections 50 is slightly larger than the outer diameter of each of the battery cells 1. The battery cells 1 are inserted in the respective battery retention sections 50. In the battery module of Example 1, four of the battery cells 1 are connected in series by one of the bus bars 91 as one set. A conductive material layer, which is not shown in the figures, is disposed between the bus bars 91 and the battery cells 1. The conductive material layer is a layer for electrically connecting the bus bars 91 and the terminals 19 of the battery cells 1. The shape of the conductive material layer is not particularly limited, and may be formed using a known method such as tab welding, wire bonding, and brazing, etc.

The separator 90 is locally interposed between the bus bars 91 and the battery cells 1. The separator 90 is a member for connecting the battery cells 1 through the bus bars 91 while preventing short circuiting by partially blocking electric connection between the battery cells 1 and the bus bars 91. The separator 90 may be formed of an insulating material, and is made of an insulation resin in the present example.

Each of the adhesion parts 42 is a layer that is formed of the hardened adhesive and the porous layer 40, interposed between the inner circumferential surface 51 of the battery retention section 50 formed on the holder 5 and the outer circumferential surface 11 of each of the battery cells 1, and bound to the inner circumferential surface 51 of the battery retention section 50 and the outer circumferential surface 11 of each of the battery cells 1. As shown in FIG. 3, each of the adhesion parts 42 has a two-phase structure formed of the porous layer 40 and the adhesive impregnating the porous layer 40. In other words, in each of the adhesion parts 42, the adhesive is dispersed in a matrix formed by the porous layer 40. Each of the adhesion part 42 is disposed throughout the whole binding area Z of each of the battery cells 1. In the binding area Z, each of the adhesion parts 42 is interposed between the outer circumferential surface 11 of each of the battery cells 1 and the inner circumferential surface 51 of the battery retention section 50 over the whole circumference of each of the battery cells 1. Thus, each of the adhesion parts 42 in Example 1 has a substantially cylindrical shape as shown in FIG. 2. The inner circumferential surface of each of the adhesion parts 42 is in contact with the outer circumferential surface 11 of each of the battery cells 1, and the outer circumferential surface 41 of each of the adhesion parts 42 is in contact with the inner circumferential surface 51 of the battery retention section 50. Thus, in the binding area Z, each of the adhesion parts 42 is spread throughout the gap between the outer circumferential surface 11 of each of the battery cells 1 and the inner circumferential surface 51 of the battery retention section 50, and is loaded over the whole circumference in the circumferential direction and the full length in the axial direction without leaving any gaps.

With the manufacturing method of Example 1, as described above, substantially the whole adhesion layer 4 penetrates the adhesion space 20 at the insertion step. As shown n FIG. 3, in the battery module of Example 1 obtained from the manufacturing method of Example 1, the amount each of the adhesion parts 42 that leaks out or remains at the back edge of the battery retention section 50 in the insertion direction is very small. The reason is because, at the insertion step, the porous layer 40 capable of retaining its shape is located forward in the insertion direction, and the porous layer 40 draws the adhesive into the adhesion space 20. In addition, since the porous layer 40 holds the adhesive in the fine pores, the amount of the adhesion parts 42 leaking out on the front edge in the insertion direction of the battery cells 1 is also very small. Thus, in the battery module of Example 1, contamination of the battery cells 1 and the battery retention section 50 by an adhesive is suppressed.

Example 2

Figure 6:
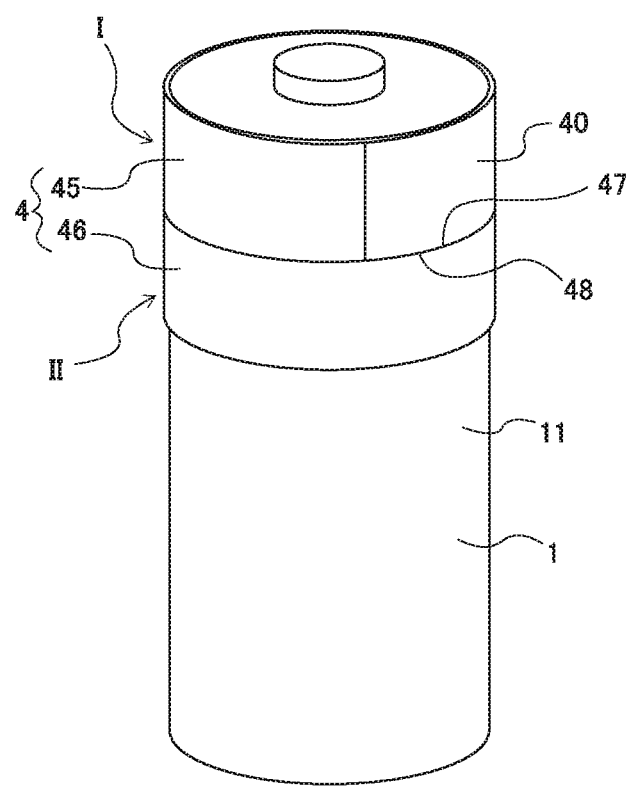
FIG. 6 is an illustrative diagram schematically showing an adhesion layer-forming step of a manufacturing method of Example 2.
Figure 7:
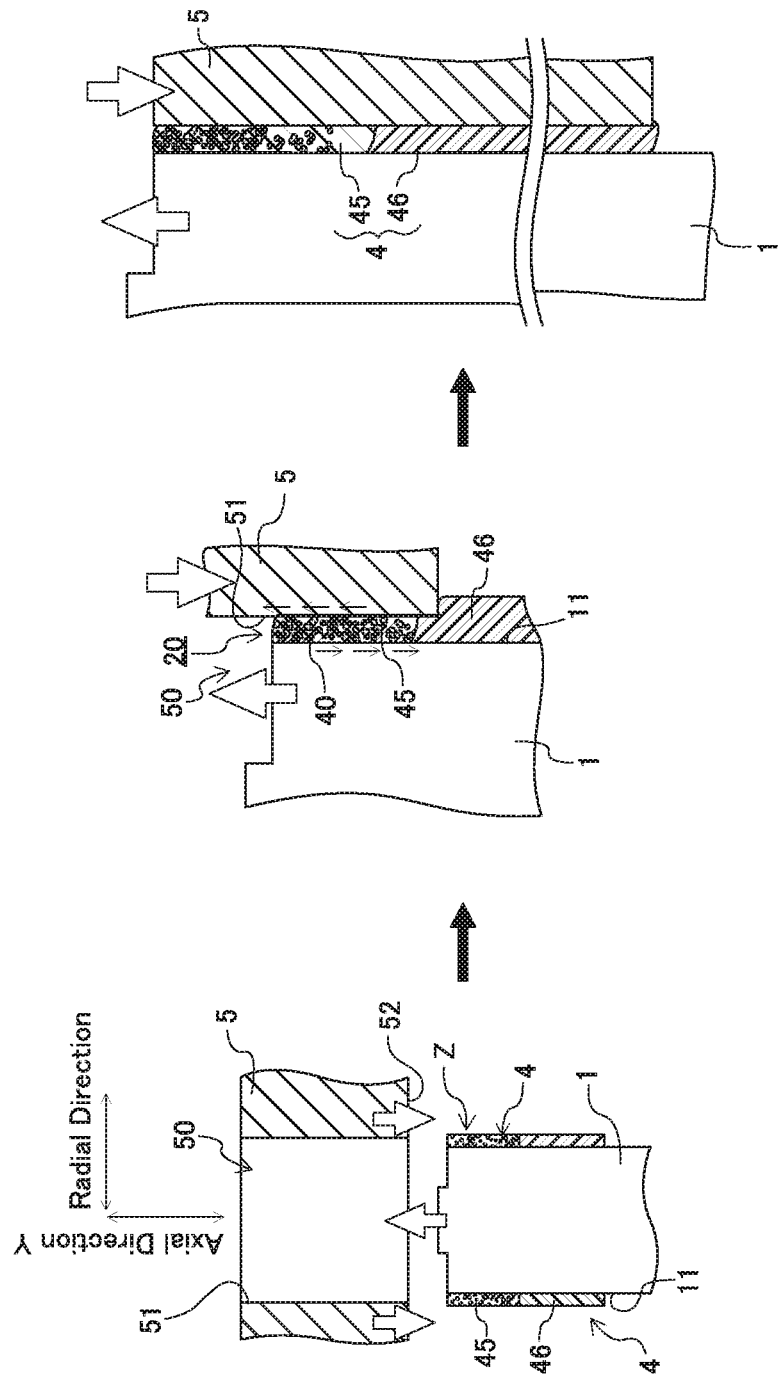
FIG. 7 is an illustrative diagram schematically showing an insertion step of the manufacturing method of Example 2.

Example 2 relates to the second method for manufacturing the battery module of the present invention. A manufacturing method of Example 2 is roughly identical to the manufacturing method of Example 1 except for the adhesion layer-forming step. A battery module of Example 2 is roughly identical to the battery module of Example 1 except for the adhesion layer. As a result, the preparing step and the cell binding step in the manufacturing method of Example 2 are roughly identical to those in the manufacturing method of Example 1. Thus, only the adhesion layer-forming step and the insertion step are described in Example 2. FIG. 6 is an illustrative diagram schematically showing the adhesion layer-forming step of the manufacturing method of Example 2 FIG. 7 is an illustrative diagram schematically showing the insertion step of the manufacturing method of Example 2.

(Adhesion Layer-Forming Step)

At the adhesion layer-forming step of the manufacturing method of Example 2, a porous layer 40 whose length in the axial direction is smaller than that of Example 1 is formed on the outer circumferential surface 11 of each of the battery cells 1, and this porous layer 40 is impregnated with the same adhesive as in Example 1. An area where the porous layer 40 is formed on the outer circumferential surface 11 of each of the battery cells 1 is referred to as a first area I. The first area I is an area located forward in the insertion direction on the outer circumferential surface 11 of each of the battery cells 1.

At a second area II located adjacent to the first area I and on the back side thereof in the insertion direction on the outer circumferential surface 11 of each of the battery cells 1, an adhesive having a higher viscosity than the adhesive impregnating the porous layer 40 is applied to form the adhesive layer. "The adhesive having a high viscosity" can also be rephrased as "an adhesive capable of maintaining a relative position between a battery cell and holder to enable easy retention of shape also in the insertion step," or "an adhesive having low fluidity compared to a low viscosity adhesive." In addition, "low viscosity adhesive" can also be rephrased as "an adhesive capable of functioning as a lubricant at the insertion step," or "an adhesive having high fluidity compared to a high viscosity adhesive." in the following, if necessary, the adhesive forming the adhesive layer is referred to as a high viscosity adhesive, and the adhesive impregnating the porous layer 40 is referred to as a low viscosity adhesive. A layer including the porous layer 40 and the adhesive impregnating the porous layer 40 is referred to as a front part 45, and a layer including a high viscosity adhesive is referred to as a back part 46. Thus, in the manufacturing method of Example 2, the adhesion layer 4 is formed from the front part 45 and the back part 46. The back part 46 in the manufacturing method of Example 2 corresponds to the adhesive layer in the manufacturing method of the present invention.

The front part 45 is, except for its length in the axial direction, roughly identical to the adhesion layer 4 in the manufacturing method of Example 1. The thickness of the front part 45 and the thickness of the back part 46 are substantially identical, and these thicknesses are substantially identical to the thickness of the adhesion layer 4 in Example 1. An insertion-direction front edge 47 of the back part 46 is in contact with an insertion-direction back edge 48 of the front part 45. The front part 45 and the back part 46 are both disposed over the whole circumference of the outer circumferential surface 11 of each of the battery cells 1.

As shown in the left side portion of FIG. 7, upon axis alignment, the outer circumferential surface of the front part 45 and the outer circumferential surface of the back part 46 having a cylindrical shape are positioned outward in the radial direction from the inner circumferential surface 51 of the battery retention section 50. Also in the manufacturing method of Example 2, the thickness of the porous layer 40 is about 1.0 to 2.0 mm, and the thickness of the adhesion layer 4 is about 0.4 to 1.0 mm. In addition, the width of the adhesion space 20 is about 0.1 to 0.4 mm. The difference between the thickness of the adhesion layer 4 and the width of the adhesion space 20 is about 0 to 0.4 mm.

(Insertion Step)

After the adhesion layer-forming step described above, each of the battery cells 1 having the adhesion layer 4 formed thereon is aligned with the battery retention section 50 of the holder 5 using respective axes, and each of the battery cells 1 is inserted in the battery retention section 50. The thickness of the adhesion layer 4 disposed on the outer circumferential surface 11 of each of the battery cells 1 is larger than the width of the adhesion space 20. Thus, also in the manufacturing method of Example 2, when inserting the battery cells 1 in the battery retention section 50, the adhesion layer 4 is pressed against the insertion edge 52 of the battery retention section 50 and the inner circumferential surface 51 of the battery retention section 50. The front part 45 that forms the forward portion of the adhesion layer 4 in the insertion direction includes, similarly to the adhesion layer 4 of Example 1, the deformable porous layer 40, and an adhesive having a higher fluidity than the porous layer 40 and capable of deforming easier than the porous layer 40. Thus, the front part 45 penetrates, similarly to the adhesion layer 4 of Example 1, the adhesion space 20 without leaving any gaps through interaction between the porous layer 40 and the adhesive. On the other hand, although the back part 46 located adjacent to the front part 45 does not include the porous layer 40, the back part 46 is drawn by the front part 45 and penetrates the adhesion space 20. Since the adhesive included in the back part 46 is a high viscosity adhesive whose viscosity is higher than that of the low viscosity adhesive included in the front part 45, similarly to the porous layer 40 of the front part 45, the back part 46 slides into the adhesion space 20 through lubricative action of the low viscosity adhesive, and applies and spreads the low viscosity adhesive over the inner circumferential surface 51 of the battery retention section 50. As a result, similarly to the front part 45, the back part 46 also fills the adhesion space 20 without leaving any gaps. Thus, at the insertion step, the adhesion layer 4 fills the adhesion space 20 without leaving any gaps over the whole circumference in the circumferential direction and the full length in the axial direction.

Thus, also with the manufacturing method of Example 2, the battery module in which the adhesion layer 4 sufficiently fills the gap between the battery retention section 50 of the holder 5 and each of the battery cells 1 can be manufactured easily.

In the adhesion layer-forming step of the manufacturing method of Example 2, although the length of the front part 45 in the axial direction and the length of the back part 46 in the axial direction are substantially the same, the ratio of the length of the front part 45 in the axial direction with respect to the length of the back part 46 in the axial direction is not particularly limited, as long as the shape of the front part 45 can be sufficiently retained.

With regard to the high viscosity adhesive used for the back part 46, as long as the viscosity is higher than that of the low viscosity adhesive at the insertion step, the viscosities before the adhesion layer-forming step and after the insertion step are not particularly limited.

In Example 2, although the back part 46 includes the high viscosity adhesive and the front part 45 includes the low viscosity adhesive; the adhesive included in the back part 46 and the adhesive included in the front part 45 may be the same. In addition, the adhesive included in the front part 45 may be the high viscosity adhesive and the adhesive included in the back part 46 may be the low viscosity adhesive. In all cases, since the front part 45 penetrates the adhesion space 20 based on interaction between the porous layer 40 and the adhesive, and the back part 46 in contact with the front part 45 is also drawn into the adhesion space 20 by the front part 45; the adhesion space 20 is filled with the adhesion layer 4 without leaving any gaps over the whole circumference in the circumferential direction and the full length in the axial direction.

Although the front part 45 and the back part 46 are preferably disposed so as to make contact with each other at the adhesion layer-forming step, for example, the front part 45 and the back part 46 may be slightly spaced at the adhesion layer-forming step. In this case, when the front part 45 that has deformed at the insertion step and has swelled at the back in the insertion direction makes contact with the back part 46, the back part 46 is drawn by the front part 45 and penetrates the adhesion space 20 similarly.

An adhesive in the present invention refers to a composition that can change from a fluid into a solid, and can bind, when changing from a fluid into a solid, at least the outer circumferential surface 11 of each of the battery cells 1 and the inner circumferential surface 51 of the battery retention section 50. For example, the adhesive may be a fluid at the insertion step, i.e., when each of the battery cells 1 is being inserted in the battery retention section 50. Any adhesive may be used as long as, at the cell binding step, i.e., after each of the battery cells 1 is inserted in the battery retention section 50, the adhesive can harden because of a chemical reaction, evaporation of a solvent, or the like, change into a solid from a fluid, and bind the inner circumferential surface 51 of the battery retention section 50 and the outer circumferential surface 11 of each of the battery cells 1. Here, a fluid refers to a state of capable of flowing, and is a concept including forms such as liquid, gel, sol, and slurry. Specific examples of the adhesive include reactive-type adhesives, solvent based adhesives, emulsion adhesives, hot-melt adhesives, and synthetic rubber based adhesives, etc.

Any high viscosity adhesive can be used as long as the high viscosity adhesive has a higher viscosity than that of the low viscosity adhesive, and the high viscosity adhesive and the low viscosity adhesive may be formed from different materials, or may be formed from the same material. The viscosity of the adhesive can be adjusted using various methods. For example, the viscosity can be adjusted by appropriately setting molecular weights of resin components such as oligomers and polymers included in the adhesive. Generally, a resin component with a low molecular weight is regarded to have low viscosity when compared to a resin component with a high molecular weight. Alternatively the viscosity of the adhesive can be adjusted by blending various fillers to the adhesive. Furthermore, the viscosity of the adhesive can also be adjusted by appropriately setting the type and amount of the filler. When a filler with small particle size is used, depending on the type and particle size of the filler, etc., the viscosity of the adhesive is generally said to increase as the blended amount of the filler increases. When the adhesive is a solvent based adhesive or an emulsion adhesive, the viscosity of the adhesive can be adjusted by appropriately adjusting the blending ratio of the solvent or dispersion medium (i.e., solid content concentration of the adhesive). The viscosity of the adhesive increases when the solid content concentration is higher. Furthermore, the viscosity of the adhesive can also be adjusted by appropriately changing the mixing ratio of a main agent and a curing agent, and the type of the main agent and/or the curing agent.

The battery module of Example 2 obtained by the manufacturing method of Example 2 is roughly identical to the battery module of Example 1 except for the adhesion parts 42, and is largely different from the battery module of Example 1 regarding that the porous layer 40 exists only at the front part 45 and the porous layer 40 does not exist at the back part 46.

Example 3

Figure 8:
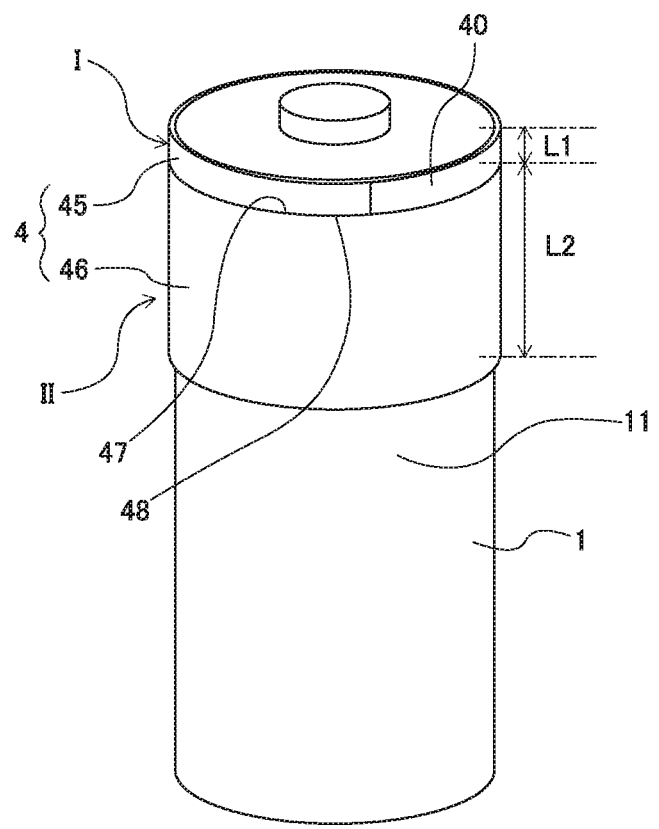
FIG. 8 is an illustrative diagram schematically showing an adhesion layer-forming step of a manufacturing method of Example 3.

Example 3 relates to the second method for manufacturing the battery module of the present invention. A manufacturing method of Example 3 is also roughly identical to the manufacturing method of Example 1 except for the adhesion layer-forming step. A battery module of Example 3 is roughly identical to the battery module of Example 1 except for the adhesion part. Thus, similarly to Example 2, only the adhesion layer-forming step and the insertion step are described in Example 3. FIG. 8 is an illustrative diagram schematically showing the adhesion layer-forming step of the manufacturing method of Example 3. FIG. 9 is an illustrative diagram schematically showing the insertion step of the manufacturing method of Example 3.

(Adhesion Layer-Forming Step)

As shown in FIG. 8, at the adhesion layer-forming step of the manufacturing method of Example 3, a porous layer 40 whose length in the axial direction is shorter than that of Example 2 is formed at the first area I on the outer circumferential surface 11 of each of the battery cells 1, and the porous layer 40 is not impregnated with the adhesive. The high viscosity adhesive identical to that in Example 2 is applied on the second area II to form an adhesive layer. Thus, in Example 3, the front part 45 does not include the adhesive, the length L1 of the front part 45 in the axial direction is shorter than that in Example 2, and the length L2 of the back part 46 in the axial direction is longer than that in Example 2. A sum of the length L1 of the front part 45 in the axial direction and the length L2 of the back part 46 in the axial direction, i.e., the length of the adhesion layer 4 in the axial direction, is identical to that in Example 2. In addition, the thickness of the adhesion layer 4 is also identical to that in Example 2. The insertion-direction front edge 47 of the back pare 46 is in contact with the insertion-direction back edge 48 of the front part 45. The front part 45 and the back part 46 are both disposed over the whole circumference of the outer circumferential surface 11 of each of the battery cells 1.

As shown in the left side portion of FIG. 9, upon axis alignment, the outer circumferential surface of the front part 45 and the outer circumferential surface of the back part 46 having a cylindrical shape are positioned outward in the radial direction from the inner circumferential surface 51 of the battery retention section 50. Also in the manufacturing method of Example 3, the thickness of the porous layer 40 is about 1.0 to 2.0 mm, and the thickness of the adhesion layer 4 is about 0.4 to 1.0 mm. In addition, the width of the adhesion space 20 is about 0.1 to 0.4 mm. The difference between the thickness of the adhesion layer 4 and the width of the adhesion space 20 is about 0 to 0.4 mm.

(Insertion Step)

After the adhesion layer-forming step described above, each of the battery cells 1 having the adhesion layer 4 formed thereon is aligned with the battery retention section 50 of the holder 5 using respective axes, and each of the battery cells 1 is inserted in the battery retention section 50. The thickness of the adhesion layer 4 disposed on the outer circumferential surface 11 of each of the battery cells 1 is larger than the width of the adhesion space 20. Thus, as shown in the central portion in FIG. 9, also in the manufacturing method of Example 3, when inserting the battery cells 1 in the battery retention section 50, the adhesion layer 4 is pressed against the insertion edge 52 of the battery retention section 50 and the inner circumferential surface 51 of the battery retention section 50.

The front part 45 of the adhesion layer 4 consists only of the deformable porous layer 40. Thus, although the front part 45 does not have any lubricative action by an adhesive, the porous layer 40 penetrates the adhesion space 20 without leaving any gaps by its own shape retention force. On the other hand, although the back part 46 located adjacent to the front part 45 does not include the porous layer 40; similarly to Example 2, the back part 46 is drawn by the front part 45 and penetrates the adhesion space 20. Since the back part 46 includes the adhesive, the back part 46 slides in the adhesion space 20 through its own lubricative action and the adhesive is applied and spread over the inner circumferential surface 51 of the battery retention section 50. The insertion-direction front edge 47 of the back part 46 being in contact with the front part 45 can be rephrased as the back part 46 being adhered to the front part 45. Thus, the back part 46 is drawn by the front part 45 as a whole and fills the adhesion space 20 without leaving any gaps. As a result, also in the manufacturing method of Example 3, at the insertion step, the adhesion space 20 is filled with the adhesion layer 4 without leaving any gaps over the whole circumference in the circumferential direction and the full length in the axial direction.

Thus, also with the manufacturing method of Example 3, a battery module in which each of the adhesion parts 42 sufficiently fills the interval between the battery retention section 50 of the holder 5 and each of the battery cells 1 can be manufactured easily.

In the adhesion layer-forming step of the manufacturing method of Example 3, the length L2 of the back part 46 in the axial direction is set to be larger than the length L1 of the front part 45 in the axial direction. However, the ratio of the length L2 of the back part 46 in the axial direction with respect to the length L1 of the front part 45 in the axial direction is not particularly limited in the manufacturing method of the present invention. For example, depending on the adhesive strength required for the battery module, the length L2 of the back part 46 in the axial direction may be smaller than the length L1 of the front part 45 in the axial direction.

In Example 3, the length L2 of the back part 46 in the axial direction is set to be larger than the length L1 of the front part 45 in the axial direction in order to increase the proportion of the adhesive in the adhesion layer 4 and increase the adhesive strength of the adhesion layer 4. From a standpoint of the adhesive strength, the length L2 of the back part 46 in the ax direction is preferably larger than the length L1 of the front part 45 in the axial direction. More specifically, the length L2 of the back part 46 in the axial direction is preferably at least two times, more preferably three times, larger than the length L1 of the front part 45 in the axial direction.

The porous layer 40 used in the manufacturing method of Example 3 does not have to be impregnated with the adhesive. Thus, in manufacturing method of Example 3, a closed-cell type porous layer 40 can be used. Also in this case, the adhesive included in the back part 46 adheres to the front part 45 at a boundary portion with respect to the back part 46. As a result, in the front part 45, fine pores having an opening at the boundary portion are impregnated with the adhesive. Thus, also in this case, at least one portion of the front part 45 can be considered to be impregnated with the adhesive. At the insertion step, in order to have the back part 46 drawn by the front part 45 with high reliability, the front part 45 is preferably adhered to the back part 46 firmly at the adhesive layer-forming step. Thus, the surface area of the front part 45 at a boundary portion with respect to the back part 46 is preferably large, and the front part 45 is preferably formed of the porous layer 40 that is an open-cell type. When the front part 45 is formed from the porous layer 40 that is an open-cell type, the whole front part 45 is in some cases impregnated with the adhesive at the insertion step, depending on the viscosity of the adhesive, and the ratio of lengths of the front part 45 and the back part 46 in the axial direction, etc.

The battery module of Example 3 obtained by the manufacturing method of Example 3 is roughly identical to the battery module of Example 2 except for the adhesion parts 42, but is largely different from the battery module of Example 2 regarding the adhesive almost not existing at the front part 45.

The battery module of the present invention is not particularly limited in terms of its use application, and can be disposed in various devices and equipment, etc. Specific examples thereof include assembled batteries to be mounted on vehicles.

(Note 1)

The present invention is not limited to the embodiments described above and in the drawings, and can be implemented after being appropriately modified without departing from the gist of the invention. Furthermore, components shown in the embodiments may be extracted and freely combined to be implemented.

(Note 2)

The method for manufacturing the battery module of the present invention can be expressed as described in the following.

(1) A method for manufacturing a battery module, the method including: a preparing step of preparing a battery cell 1 and a holder 5 having a battery retention section 50 with a hole; an adhesion layer-forming step of forming an adhesion layer 4 on an outer circumferential surface 11 of the battery cell 1; and an insertion step of inserting the battery cell 1 in the battery retention section 50 of the holder 5, wherein in the adhesion layer-forming step, a deformable porous layer 40 is formed on the outer circumferential surface 11 of the battery cell 1 and the porous layer 40 is impregnated with an adhesive to form an adhesion layer including the porous layer and the adhesive.

(2) A method for manufacturing a battery module, the method including: a preparing step of preparing a battery cell 1 and a holder 5 having a battery retention section 50 with a hole; an adhesion layer-forming step of forming an adhesion layer 4 on an outer circumferential surface 11 of the battery cell 1; and an insertion step of inserting the battery cell 1 in the battery retention section 50 of the holder 5, wherein at the adhesion layer-forming step, a deformable porous layer 40 is formed in a first area I which is a part of the outer circumferential surface 11 of the battery cell 1, and an adhesion layer including an adhesive is formed on a second area II located adjacent to the first area I and on a back side thereof in an insertion direction for the battery cell 1 to form an adhesive layer including the porous layer and the adhesive.

(3) The manufacturing method the battery module according to (1) or (2), wherein at the adhesion layer-forming step, at least at one part of an area of the outer circumferential surface 11 of the battery cell 1 in the axial direction Y, the adhesion layer 4 is formed on a whole circumference of the outer circumferential surface 11 of the battery cells 1.

(4) The method for manufacturing the battery module according to any one of (1) to (3), wherein the porous layer 40 is elastically deformable.

(5) The method for manufacturing of the battery module according to any one of (2) to (4), wherein at the adhesion layer-forming step, the porous layer 40 and the adhesive layer are brought in contact with each other.

(6) The method for manufacturing the battery module according to any one of (2) to (5), wherein at the adhesion layer-forming step, the porous layer 40 is impregnated with a low viscosity adhesive having a lower viscosity than that of the adhesive included in the adhesive layer.

(7) A battery module including: a holder 5 having a battery retention section 50 with a hole; a battery cell 1 inserted in the battery retention section 50 of the holder 5; and an adhesion part 42 interposed between the holder 5 and the battery cell 1, wherein the adhesion part 42 includes a porous layer 40, and an adhesive impregnating at least one part of the porous layer 40.

The invention claimed is:

1. A method for manufacturing a battery module, the method comprising:
preparing a battery cell and a holder having a battery retention section with a hole;
forming an adhesion layer on an outer circumferential surface of the battery cell, wherein in the forming of the adhesion layer,
a deformable porous layer is formed in a first area, which is a part of the outer circumferential surface of the battery cell, and
an adhesive layer including an adhesive is formed on a second area located adjacent to the first area in an insertion direction of the battery cell to form the adhesion layer including the deformable porous layer and the adhesive;
deforming the deformable porous layer by inserting the battery cell into the battery retention section of the holder in the insertion direction; and
binding the battery cell to the holder by hardening the adhesive into a solid state to form an adhesion part that adheres the battery cell to the holder.

2. The method for manufacturing the battery module according to claim 1, wherein
in the forming of the adhesion layer,
at least at one part of an area of the outer circumferential surface of the battery cell in an axial direction, the adhesion layer is formed on a whole circumference of the outer circumferential surface of the battery cell.

3. The method for manufacturing the battery module according to claim 1, wherein the porous layer is elastically deformable.

4. The method for manufacturing the battery module according to claim 1, wherein in the forming of the adhesion layer, the porous layer and the adhesive layer are brought in contact with each other.

5. The method for manufacturing the battery module according to claim 1, wherein in the forming of the adhesion layer, the porous layer is permeated with a low viscosity adhesive having a lower viscosity than that of the adhesive included in the adhesive layer.

6. The method for manufacturing the battery module according to claim 1, wherein in the deforming of the porous layer by inserting the battery cell, the porous layer is permeated with the adhesive.

7. The method for manufacturing the battery module according to claim 1, wherein
the battery cell includes a housing.

* * * * *